(12) United States Patent
Diamond

(10) Patent No.: US 10,408,063 B2
(45) Date of Patent: Sep. 10, 2019

(54) THERMAL SHIELDING IN A GAS TURBINE

(71) Applicant: ROLLS-ROYCE plc, London (GB)

(72) Inventor: Stephen Christopher Diamond, Derby (GB)

(73) Assignee: ROLLS-ROYCE plc, London (GB)

(*) Notice: Subject to any disclaimer, the term of this patent is extended or adjusted under 35 U.S.C. 154(b) by 495 days.

(21) Appl. No.: 15/084,651

(22) Filed: Mar. 30, 2016

(65) Prior Publication Data

US 2016/0312620 A1  Oct. 27, 2016

(30) Foreign Application Priority Data

Apr. 21, 2015 (GB) .................................. 1506728.3

(51) Int. Cl.
*F01D 5/18* (2006.01)
*B23P 15/02* (2006.01)
(Continued)

(52) U.S. Cl.
CPC .............. *F01D 5/187* (2013.01); *B22D 15/02* (2013.01); *B22D 25/02* (2013.01); *B23P 15/02* (2013.01);
(Continued)

(58) Field of Classification Search
CPC .......... F01D 5/186; F01D 5/187; F01D 5/188; F01D 5/18; F05D 2250/185;
(Continued)

(56) References Cited

U.S. PATENT DOCUMENTS

| | | | |
|---|---|---|---|
| 4,127,358 A | * | 11/1978 | Parkes .................... F01D 5/187 416/191 |
| 4,820,123 A | * | 4/1989 | Hall ........................ F01D 5/081 416/92 |

(Continued)

FOREIGN PATENT DOCUMENTS

| | | |
|---|---|---|
| DE | 102004002327 A1 | 8/2005 |
| EP | 1577497 A1 | 9/2005 |

(Continued)

OTHER PUBLICATIONS

Sep. 19, 2016 Search Report issued in European Patent Application No. 16162567.

(Continued)

*Primary Examiner* — Christopher Verdier
(74) *Attorney, Agent, or Firm* — Oliff PLC

(57) ABSTRACT

A turbine blade having a labyrinth of internal channels for circulation of coolant received through an inlet formed in a terminal portion of a blade root. A labyrinth geometry includes: (i) the inlet arranged on an axially upstream face of the terminal portion leading to an upstream duct portion having a first section adjacent the inlet and a second section having a reduced cross-section compared to the first section, (ii) a leading edge passage intersecting with the first section and extending through a blade body towards a tip of the blade, where a proximal end of the leading edge passage is angled towards a direction of incoming air flow, (iii) a main blade passage intersecting with a downstream duct portion arranged in axial alignment with, and separate from, the upstream duct portion, and (iv) a restrictor passage intersecting with a mid-blade passage and extending towards a mid-blade duct portion.

16 Claims, 7 Drawing Sheets

(51) Int. Cl.
*F01D 11/00* (2006.01)
*B22D 15/02* (2006.01)
*B22D 25/02* (2006.01)

(52) U.S. Cl.
CPC .............. *F01D 5/18* (2013.01); *F01D 5/188* (2013.01); *F01D 11/00* (2013.01); *B23P 2700/06* (2013.01); *F01D 5/186* (2013.01); *F05D 2220/32* (2013.01); *F05D 2230/00* (2013.01); *F05D 2230/10* (2013.01); *F05D 2230/12* (2013.01); *F05D 2230/21* (2013.01); *F05D 2240/30* (2013.01); *F05D 2250/14* (2013.01); *F05D 2260/20* (2013.01); *F05D 2260/202* (2013.01); *Y10T 29/49341* (2015.01)

(58) Field of Classification Search
CPC ........... F05D 2260/20; F05D 2260/202; F05D 2230/21; F05D 2230/12; B22D 25/00; B22D 25/02; B22D 15/02; B23P 15/02; B23P 2700/06; Y10T 29/49341
USPC ....... 416/90 R, 91, 92, 95, 96 R, 96 A, 97 R
See application file for complete search history.

(56) References Cited

U.S. PATENT DOCUMENTS

| | | | | |
|---|---|---|---|---|
| 7,766,619 | B2* | 8/2010 | Fokine | F01D 5/187 |
| | | | | 416/97 R |
| 10,151,205 | B2* | 12/2018 | Barry | B23P 15/02 |
| 2006/0292006 | A1* | 12/2006 | Naik | F01D 5/081 |
| | | | | 416/97 R |
| 2012/0134845 | A1* | 5/2012 | Khanin | F01D 5/187 |
| | | | | 416/97 R |
| 2014/0086756 | A1* | 3/2014 | Papple | F01D 5/081 |
| | | | | 416/90 R |

FOREIGN PATENT DOCUMENTS

| | | |
|---|---|---|
| GB | 1 514 613 A | 6/1978 |
| WO | 2005/068783 A1 | 7/2005 |

OTHER PUBLICATIONS

Oct. 28, 2015 Search Report issued in British Patent Application No. 1506728.3.

* cited by examiner

THERMAL SHIELDING IN A GAS TURBINE

TECHNICAL FIELD

The present disclosure concerns thermal shielding in a gas turbine, more particularly, thermal shielding of the bucket groove where a turbine blade root meets the turbine disc. It also concerns control of internal cooling flows within the turbine blade such that increases of cooling flow in some internal cooling channels, does not reduce cooling flow to other internal channels/features in the turbine blade.

BACKGROUND OF THE INVENTION AND PRIOR ART

In a gas turbine engine, ambient air is drawn into a compressor section. Alternate rows of stationary and rotating aerofoil blades are arranged around a common axis, together these accelerate and compress the incoming air. A rotating shaft drives the rotating blades. Compressed air is delivered to a combustor section where it is mixed with fuel and ignited. Ignition causes rapid expansion of the fuel/air mix which is directed in part to propel a body carrying the engine and in another part to drive rotation of a series of turbines arranged downstream of the combustor. The turbines share rotor shafts in common with the rotating blades of the compressor and work, through the shaft, to drive rotation of the compressor blades.

It is well known that the operating efficiency of a gas turbine engine is improved by increasing the operating temperature. The ability to optimise efficiency through increased temperatures is restricted by changes in behaviour of materials used in the engine components at elevated temperatures which, amongst other things, can impact upon the mechanical strength of the blades and rotor disc which carries the blades. This problem is addressed by providing a flow of coolant through and/or over the turbine rotor disc and blades.

It is known to take off a portion of the air output from the compressor (which is not subjected to ignition in the combustor and so is relatively cooler) and feed this to surfaces in the turbine section which are likely to suffer damage from excessive heat. Typically the cooling air is delivered adjacent the rim of the turbine disc and directed to a port which enters the turbine blade body and is distributed through the blade, typically by means of a labyrinth of channels (not shown) extending through the blade body.

In one known arrangement, a duct is provided integral to the blade. The duct is arranged to pass through a terminal portion of the root with an inlet at an upstream face of the terminal portion and an end at or near the downstream face of the terminal portion. At its axially upstream face, the terminal portion is profiled to conform closely to the bucket groove profile and an inner wall defines the inlet which has a similar shape to the terminal portion at the upstream face. At its axially downstream end, the duct has a much smaller cross section, radially distanced from the bucket groove. An inner wall of the duct diverges from the downstream end of the duct to the inlet forming a continuous, inclined passage. One or more cooling passages are provided within the blade body and extend from a root portion towards a tip portion of the blade body.

In some arrangements the cooling passages comprise a leading edge passage and a main blade or "multi-pass" passage. The leading edge passage extends root to tip adjacent the leading edge of the blade. The "multi-pass" passage is an elongate and convoluted passage which typically incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage.). At the root portion end, the cooling passages are arranged to intersect with the duct.

SUMMARY OF THE INVENTION

According to a first aspect of the invention there is provided a turbine blade having a body enclosing a labyrinth of internal channels for the circulation of coolant received through an inlet integrally formed in a terminal portion of the blade root, the labyrinth comprising;

an inlet arranged on an axially upstream face of the terminal portion leading to an upstream duct portion having a first section adjacent the inlet and a second section axially downstream of the first, the second section having a reduced cross section compared to the first section;

a leading edge passage intersecting the first section and extending through the blade body towards the tip of the blade, a proximal end of the leading edge passage being angled, in use, towards the direction of incoming air flow;

a main blade passage intersecting a downstream duct portion, the downstream duct portion arranged in axial alignment with the upstream duct portion but separate from the upstream duct portion; and a restrictor passage intersecting with the main blade passage and extending towards a mid-blade duct portion, the mid-blade duct portion in axial alignment with the upstream and downstream duct portions and in fluid communication with the upstream duct portion.

The upstream duct first and second sections may be distinguished by a step in the wall from the first section to the second section. Alternatively, the walls may simply converge, the first section being distinguishable from the second section by the presence of the intersection with the leading edge passage.

The leading edge passage sits adjacent a wall of the leading edge of the blade and serves to cool the leading edge wall when cooling air travels through the passage. Optionally, multiple holes are provided along or adjacent the leading edge, connecting with the leading edge passage for delivering a thin film of cooling air to an exposed surface of the leading edge.

The main blade passage can be a "multi-pass" which incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage.) Optionally, multiple holes are provided in the blade body, connecting with the main blade passage for delivering a thin film of cooling air to an exposed surface of the blade. For example, where the main blade passage is a "multi-pass" and extends towards the trailing edge of the blade, multiple holes may be provided adjacent the trailing edge of the blade. Cooling holes can be provided at other positions on the blade body and may extend in arrays running root to tip and/or arrays extending leading edge to trailing edge.

The mid-blade duct portion may have its axial centre line offset relative to the axial centre line of the upstream duct portion and/or may have a smaller cross section in an axially facing direction.

The restrictor passage is relatively narrow in cross section compared to the main blade passage and the leading edge passage. This ensures a predominant flow of coolant into the leading edge passage where it is most needed.

In one option, the geometry can be provided by casting a labyrinth of passages into the blade. In this case, a core is shaped to represent the profiles of the intersecting main blade passage, downstream duct and mid-blade duct and the leading edge passage. In the core, the leading edge passage profile and mid-blade duct profile are joined by a forward breakout passage profile, the breakout passage profile having a smaller cross section than the upstream duct. Once the blade is cast and the core removed, the upstream duct is provided in a separate process. For example, the upstream duct may be machined into the cast blade. One suitable process for providing the upstream duct is plunge EDM machining. The core is configured and positioned to ensure an optimal wall thickness adjacent the bucket groove. Taking account of casting tolerances, the wall is cast to exceed or meet a minimum acceptable thickness. The post cast machining of the inlet enables the minimum wall thickness and an optimum inlet cross sectional area to be achieved in the completed blade.

The core may further include a rear breakout profile extending to a downstream edge of the blade thus providing a second exit route for the core once the blade is cast. Further breakout profiles may be provided at the tip end of the blade.

In a separate processing step, the breakout profiles near the tip and the rear breakout profile can be closed using any conventional closing technique. Closure of the breakouts better contains cooling air circulating through the leading edge passage, main blade passage and the downstream duct portion. For example, the orifice resulting from the rear breakout profile in the cast blade can be closed by a complementarily shaped pin, or joining (for example by welding) of a plate over the outlet after the core has been removed.

Optionally, as another separate processing step, after the core has been removed from the cast blade, an additional channel can be provided, for example by drilling through the downstream wall of the mid-blade duct through to the upstream wall of the downstream duct. This channel allows better control of the distribution of the available cooling air to the main blade passage ensuring flow is optimised to provide a cooling film at the blade surface. The diameter of the channel can be selected to suit blade end use requirements allowing the core geometry to be used for a variety of blades. The channel can be provided in axial alignment with the ducts but this is not essential. Optionally, the channel may be machined to incline towards the tip in an upstream to downstream direction to further encourage the delivery of air to the main blade passage.

An advantage of providing two delivery routes (the restrictor passage and the channel) for coolant to the main blade passage is that the cross sections of the two can both be kept less than the cross sectional area of the upstream duct first section and its intersection with the leading edge passage. This achieves the main objective of providing a predominant coolant flow towards the leading edge passage whilst also making good use of coolant which might otherwise sit stagnant in the downstream duct portion.

The cross sectional shapes of the passages and ducts at their intersections can be contoured to reduce stress concentrations.

One purpose of the relatively large downstream duct portion is to remove mass from the blade and aid in improving turbine efficiency.

In another aspect, the invention provides a method for making a turbine blade having the novel internal geometry of a blade in accordance with embodiments of the first aspect of the invention, the method comprising;

providing a mould defining the external geometry of the blade, providing a core defining an internal geometry of the blade, the internal geometry comprising; an inlet arranged on an axially upstream face of a terminal portion of the blade root leading to a continuous duct terminating at a mid-blade region of the terminal portion; a leading edge passage intersecting the continuous duct portion and extending through the blade body towards the tip of the blade, a proximal end of the leading edge passage being angled, in use, towards the direction of incoming air flow; a main blade passage intersecting a downstream duct portion, the downstream duct portion arranged in axial alignment with the continuous duct portion, but separate therefrom and terminating at a downstream end in a core breakout passage; and a restrictor passage intersecting with the main blade passage and extending to intersect the continuous duct in a downstream region of the continuous duct;

casting a blade between the mould and core;

removing the blade from the mould and the core from the blade;

at the inlet on the axially upstream face, machining into an upstream region of the continuous duct portion an upstream duct portion, the upstream duct portion having a first section adjacent the inlet and a second section downstream of the first section intersection with the leading edge passage, the second section having a reduced cross sectional area compared to the first section.

The main blade passage can be a "multi-pass" which incorporates multiple turns in three dimensions which extend the passage between the root and tip of the blade and from a middle section of the blade body, downstream to adjacent the trailing edge of the blade. The "multi-pass" can extend from root to tip multiple times as it travels towards the trailing edge ensuring the carriage of coolant throughout the blade body (excluding the leading edge which is cooled by the leading edge passage.)

In an optional additional step, the method includes machining a recess into the downstream face and around the core breakout passage exit, and securing (for example by joining) a plate in the recess whereby to close the breakout passage. In an alternative additional step, the method includes machining into a terminal face of the root portion, a slot which extends across the core breakout passage and securing a plate in the slot whereby to close the breakout passage. In another alternative additional step, the method includes providing a seal plate having a location lug sized to snugly fit the core breakout channel and a plate area large enough, when the lug is located in the channel, to extend past the terminal face of the root whereby, in use, to cover an interface of the blade root with a recess in a turbine disc reducing leakage of cooling air in that region and securing the plate on a downstream face of the root portion.

In another optional additional step, the method includes machining a feed hole from a downstream face of the terminal portion which extends to intersect with the main blade passage.

In another optional additional step, the method includes; entering via the inlet, machining a channel which connects the continuous duct portion with the downstream duct portion and which has a smaller cross sectional area than the adjoining duct portions and the intersection between the upstream duct first portion and the leading edge duct.

Optionally, additional core breakouts may be provided. For example, one or more breakouts may be provided adjacent the tip of the blade cast. These breakouts can be closed using known closure techniques. Optionally, the breakouts may be partially closed, retaining small cooling holes in the breakouts The machining steps may be performed using a plunge EDM technique.

BRIEF DESCRIPTION OF THE DRAWINGS

Embodiments will now be described by way of example only, with reference to the Figures, in which:

FIG. 7b is a cross section through the axis of a cast turbine blade as in FIG. 6 and illustrates the positions of post casting machining operations performed on the blade which differ only slightly in configuration to the arrangement of FIG. 7a;

DETAILED DESCRIPTION OF EMBODIMENTS OF THE INVENTION

Figure 1:
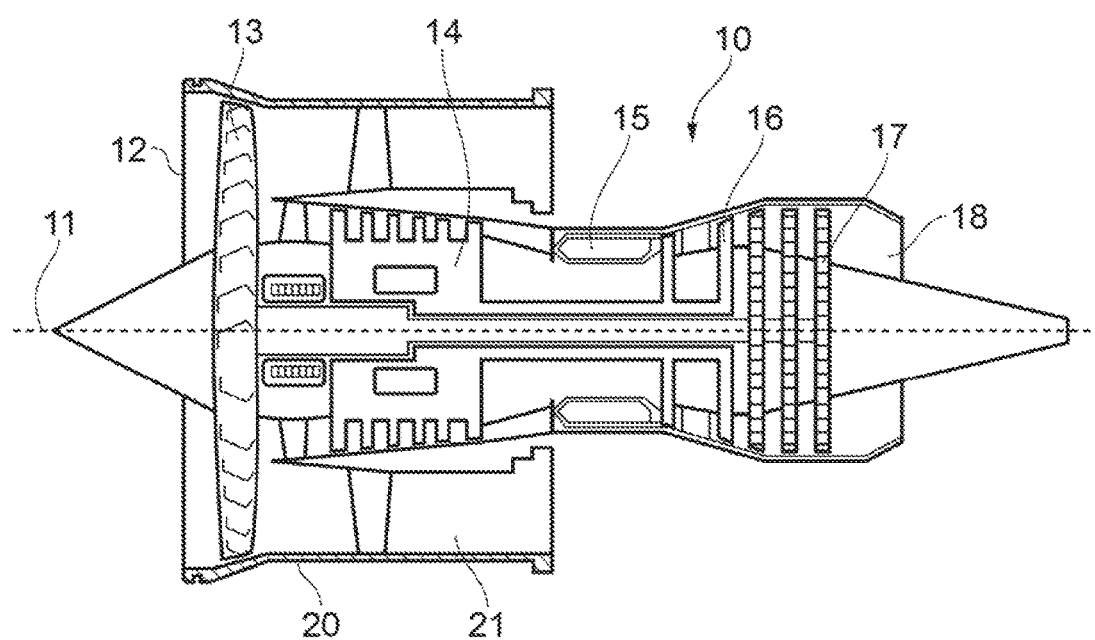
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by a suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Figure 2:
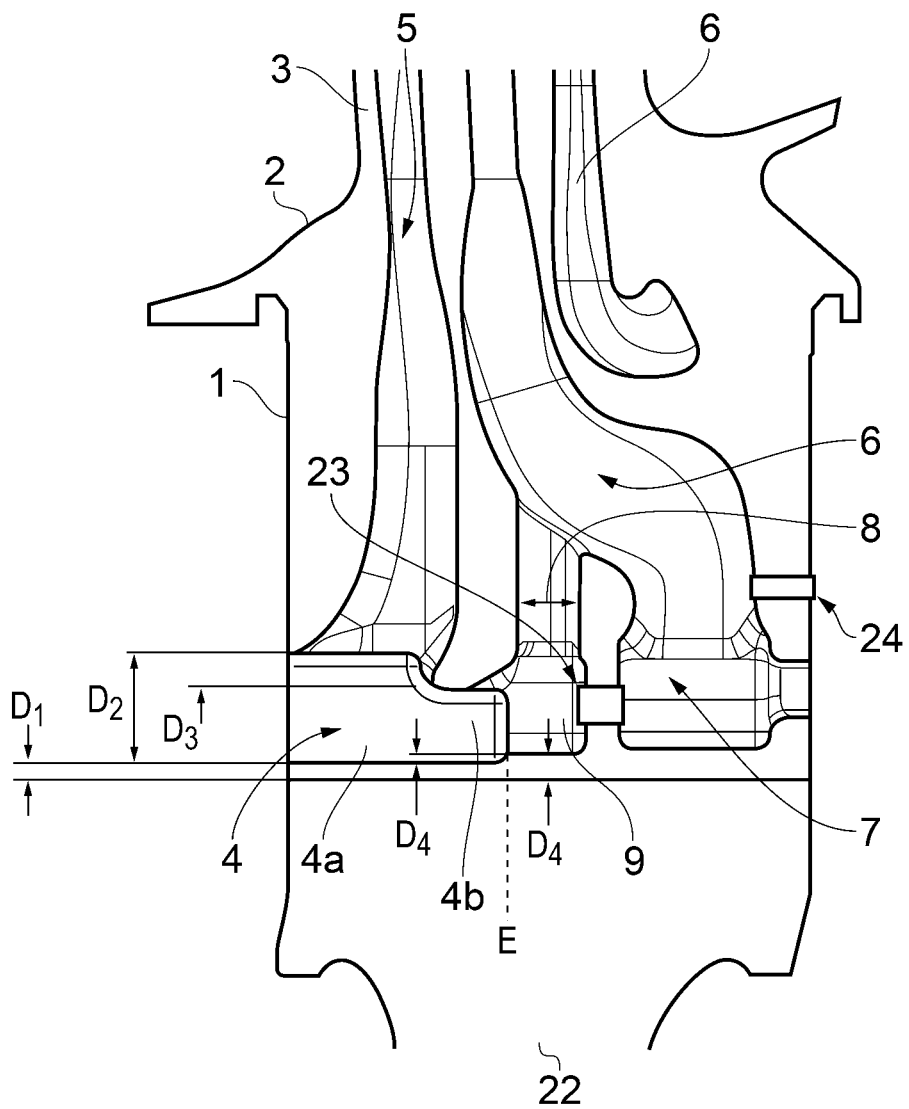
FIG. 2 is a cross section through the axis of a turbine blade incorporating a labyrinth arrangement in accordance with an embodiment of the invention.

As can be seen in FIG. 2 a turbine blade has a root portion 1, extending from a blade platform 2 and an aerofoil section 3 extending from an opposite surface of the blade platform 2. A terminal portion of the root portion 1 abuts a recessed surface in a turbine disc 22.

In an axially upstream face of the terminal portion is provided an inlet leading to upstream duct portion 4 having a first section 4a adjacent the inlet and a second section 4b, the second section having a reduced cross section compared to the first section.

A leading edge passage 5 intersects the first section 4a and extends through the root portion 1, into the aerofoil section 3 and onwards towards the tip of the blade. A proximal end of the leading edge passage 5 intersecting with the upstream duct portion first section 4a is angled, in use, towards the direction of incoming air flow.

In an axially downstream face of the root portion, a core breakout orifice leads to a downstream duct portion 7 which intersects with a multi-pass 6. The multi-pass 6 bends towards the mid-section of the root portion and extends on through to the aerofoil section 3. The multi-pass 6 turns as it approaches the tip of the aerofoil section and returns back towards the root circulating cooling air through the aerofoil section 3 body and then turns back towards the tip and the trailing edge of the blade body. As can be seen, the downstream duct portion 7 is in axial alignment with, but separate from the upstream duct portion 4.

Situated between the upstream duct portion 4 and downstream duct portion 7 is a mid-blade duct portion 9. The mid-blade duct portion 9 sits in axial alignment with the upstream and downstream duct portions 4, 7 and in fluid communication with the upstream duct portion 4. The cross sectional area of the mid-blade duct portion 9 is less than that of the upstream duct portion 4 and its intersection with the leading edge passage 5.

Intersecting with both the mid-blade duct portion 9 and the multi-pass 6 is a restrictor passage 8. The restrictor passage is relatively narrow in cross section compared to each of the leading edge passage 5 and the multi-pass 6 and their intersections with the duct portions.

It will be appreciated that the intersections between the multi-pass 6 and downstream duct portion 7, and the mid-blade duct portion 9 and restrictor passage 8 are blended and contoured to reduce stress concentrations.

The embodiment shown includes an optional multi-pass channel 23 which has been machined after casting of the blade. The channel 23 connects the downstream end of the mid-blade duct portion 9 with the upstream end of the downstream duct portion 7 providing a second route for delivering coolant to the multi-pass 6, via the downstream duct portion 7. This improves coolant delivery to the trailing edge end of the multi-pass 6. By agitating coolant in that area, the channel 23 further encourages otherwise stagnant coolant in the downstream duct portion to flow towards the multi-pass 6 and contribute to blade cooling. Whilst the channel 23 is shown in this embodiment as in axial alignment with the duct portions, this is not necessary. The channel could, for example be angled away from the axis. In one convenient arrangement, the channel is inclined in an upstream to downstream direction towards the tip of the blade. As previously discussed, the diameter of the channel 23 can be selected to match the end use requirements of the blade.

The embodiment includes a further optional feature, a feed hole 24 machined from an axially downstream face of the root portion 1 to meet the multi-pass 6, The feed hole 24 can supply cooling air to the rear disc posts which define the recess in which the terminal portion of the root portion 1 is located.

The core geometry used for the casting of the embodiment of FIG. 2 will now be described in more detail.

The root end form of the core consists of a single front face duct opening of a nominal cross sectional area. The specific duct front face geometry is to be produced after casting by pre-formed EDM tooling that is plunge fed into the duct opening for a nominal distance. The nominal wall thickness ($D_1$) of the subsequently formed duct at the base of the blade root is designed to a minimum, which allows for a maximum cooling air entry, without compromise to the structural integrity of the wall when placed in a typical operating environment. For example, the thickness $D_1$ is in the order of 1 mm+/−0.4 mm.

The core incorporates a "turning web" which curves slightly from an upstream to downstream direction before extending in a root to tip direction of the blade. The "turning web" defines part of the inner wall of the leading edge passage core section. In the cast blade, the "turning web" profile encourages coolant entering the inlet to turn to a radial direction and travel, via the leading edge passage, towards the blade tip.

The core incorporates a leading edge passage core section at the front of the duct with a rear face that descends a distance ($D_2$-$D_3$) with respect to the subsequently plunge EDM made duct which has a maximum dimension in the root to tip direction of ($D_2$-$D_3$) where $D_2$ is the distance in the root to tip direction from the inner wall of the duct to the nearest edge of the leading edge passage. $D_3$ is optionally about ⅔ of the height of $D_2$, for example 0.6 $D_2$ to 0.7 $D_2$. The bottom portion of the 'turning web' is angled to align with incoming airflow when the turbine is in use. In use, the discrete turning feature encourages airflow impinging on it to turn radially outwards in to the leading edge passage.

The core extends axially through the blade root to about 50-70% of its depth. In the cast blade, this creates the mid-blade duct portion which serves to transfer air to the mid-blade passage of the blade via the restrictor channel which is formed from an extending section of the core. The core section corresponding to the mid-blade duct portion forms a web within the leading edge duct portion at its end. The restrictor channel web section is substantially of a nominal cross sectional area that ascends from the mid-blade duct portion. A rear core breakout and cavity core portion are positioned distally from the front face duct opening and form the downstream duct portion in the cast blade. As already discussed, after casting, a channel 23 can be machined to connect the mid-blade duct portion and downstream duct portion. This geometry enables the flow of coolant to the multi-pass to be controlled to suit the blade end use requirements.

The portion of the core defining the mid-blade duct portion does not require the same full cross sectional area as the front face duct opening and so the tip corners of this core portion are contoured at their intersection with the mid-blade passage portion to reduce stresses at that location.

It will be appreciated by the skilled addressee that the core geometry is subject to casting positional and profile tolerances. As a consequence of this, the proportions of the core in critical areas adjacent the thinnest walls of the labyrinth are designed to ensure a defined minimum wall thickness when the tolerance is at its maximum. For example, the duct portion at the upstream end of the core might ensure a minimum wall thickness of 2 mm to allow for machining tolerances in the subsequent plunge EDM step and ensure a wall thickness minimum of 1 mm.

The core breaks out of the blade casting at an upstream face and a downstream face. The core breakouts are used for positional control of the core. The upstream and downstream core breakouts have a minimum cross sectional area of 20 mm$^2$ for core integrity. The downstream core breakout is set to this minimum area, since its end purpose is essentially for removing the core material after casting. However, the upstream core breakout is made significantly larger to incorporate blend radii between the upstream duct portion and the leading edge passage. The upstream core breakout is effectively consumed by the plunged EDM formation of the final upstream duct portion geometry.

The front core breakout geometry provides a duct wall inboard of the bottom and side flanks of the subsequently machined upstream duct portion providing a post casting wall thickness $D_4$, which, after machining of the upstream duct portion remains as the wall thickness of the mid-blade duct portion. The top flank of the front core breakout is again inboard of the subsequently machined upstream duct portion wall but is more carefully controlled to minimise steps in the leading edge passage feed from the subsequently machined upstream duct portion. This allows for cleaning up of the machined upstream duct portion profile when the core has its greatest positional variation. As mentioned, the final wall thickness $D_1$ of the machined upstream duct portion is chosen to ensure adequate structural strength during running at the extremes of tolerance variation. $D_1$ is selectively made as thin as practically possible to form a thermal shield for the disc groove whilst having the minimum throat area restriction for a defined disc fir tree bucket groove.

The downstream core breakout is profiled and positioned to facilitate numerous sealing configurations should they be needed. Its position is arranged to be approximately midway between the bucket groove and lower contact flanks of the root terminal portion. This positioning could permit the installation of circular sealing pins in to the downstream face of the blade to cover the exit area of the disc/blade bucket groove. Alternatively, the rear core breakout could be sealed by joining a plate over the breakout either in a recessed countersunk area or via a subsequently machined radially inclined slot. For example, the plate may be welded into position.

Figure 3:
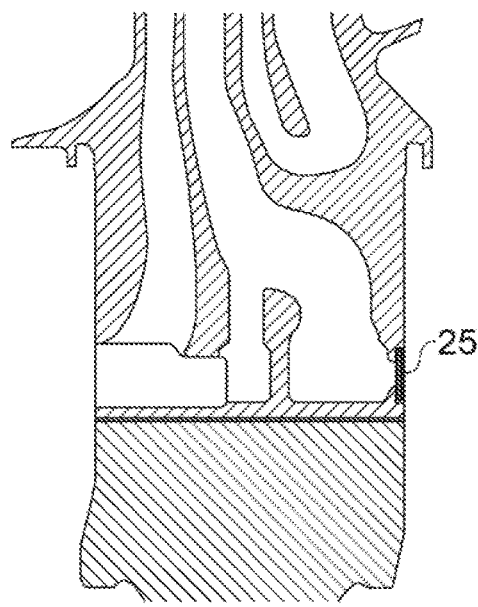
FIG. 3 is a cross section through the axis of a turbine blade incorporating a labyrinth arrangement in accordance with another embodiment of the invention.

FIGS. 3, 4*a*, 4*b* and 5 show different embodiments of the invention, each blade root shown has substantially the same core geometry as the embodiment of FIG. 2, without the additionally machined channel 23 and feed hole 24. Each of the figures shows a different arrangement for closing the downstream core breakout. In FIG. 3, a plate 25 is joined to the downstream face covering the breakout. As can be seen, a recess has been formed in the face to accommodate the plate 25. The recess may be machined, for example, by plunge EDM. Recessing of the plate assists in resistance of centrifugal forces on the plate during operation of the turbine.

Figure 4A:
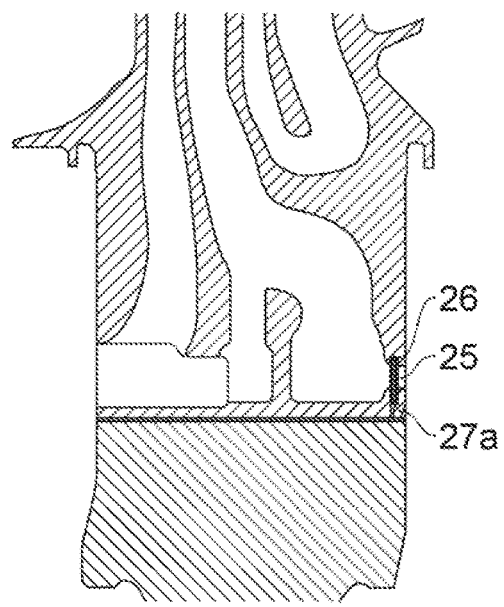
FIG. 4a is a cross section through the axis of a turbine blade incorporating a labyrinth arrangement in accordance with another embodiment of the invention.
Figure 4B:
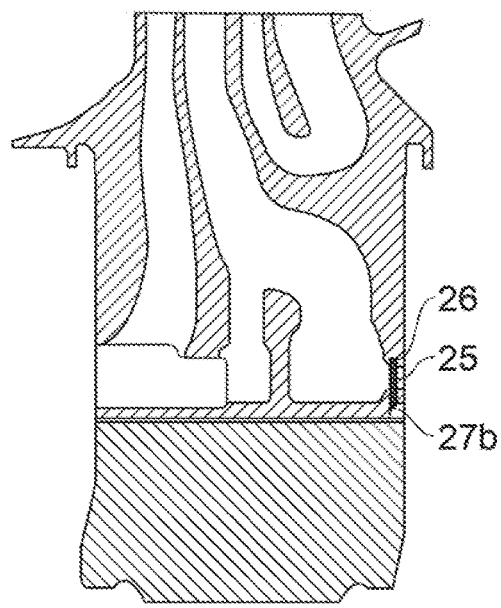
FIG. 4b is a cross section through the axis of a turbine blade incorporating a labyrinth arrangement in accordance with the embodiment of FIG. 4a, differing only by the means used to secure a plate in position.

In FIGS. 4a and 4b, a slot 26 is machined from the terminal face of the root up into and across the downstream core breakout and a plate 25 is received in the slot. In FIG. 4a, the plate is secured in position by bending in an axially downstream wall of the slot 27a to narrow or close the slot. In FIG. 4b, the plate is secured by welding a radially inward end 27b of the plate 25 to the terminal portion of the blade. Again, such arrangements resist centrifugal forces on the plate during operation of the turbine.

Figure 5:
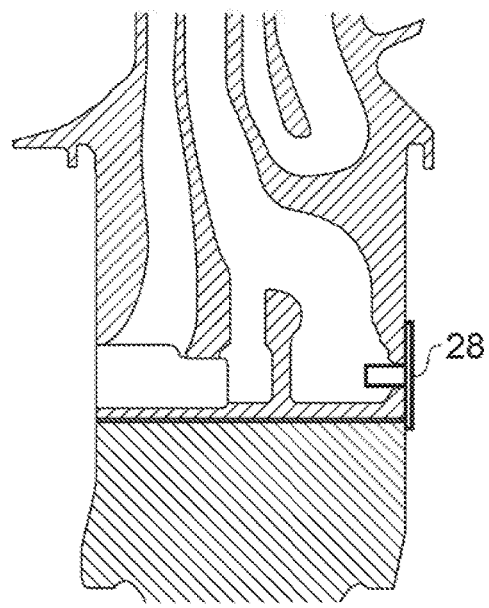
FIG. 5 is a cross section through the axis of a turbine blade incorporating a labyrinth arrangement in accordance with another embodiment of the invention.

In FIG. 5, a seal plate 28 has a location lug sized to snugly fit the core breakout channel. The plate itself extends past the terminal face of the root. In use, this extended face plate can serve also to cover the interface of the blade root in the disc recess reducing leakage in that region. The plate may be joined to the blade.

Figure 6:
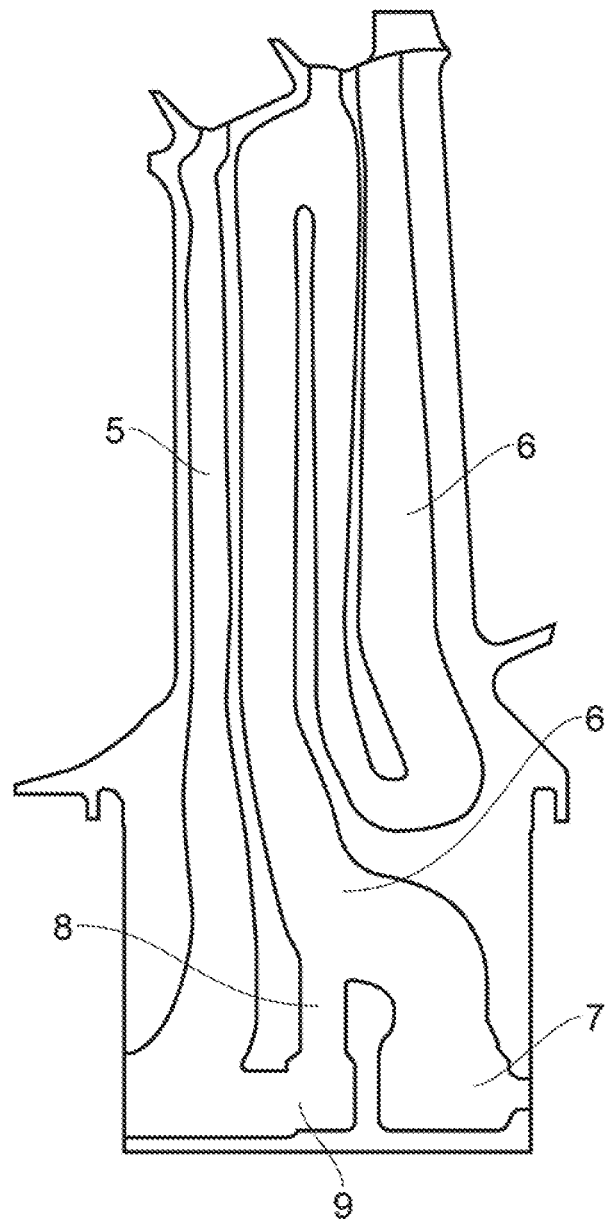
FIG. 6 is a cross section through the axis of a cast turbine blade similar to that of FIG. 2 and illustrates the geometry of the core used to define the labyrinth arrangement in the casting of the blade.

In FIG. 6 the geometry of the core used for the casting step in the manufacture of a novel turbine blade in accordance with the invention is shown. As can be seen, the core defines a leading edge passage 5, multi-pass 6, downstream duct portion 7, restrictor passage 8 and mid-blade duct portion/continuous duct 9. It will be understood from the foregoing description that the upstream part of duct portion 9 is subsequently machined to form distinct mid-blade and upstream duct portions 9 and 4 respectively.

Figure 7A:
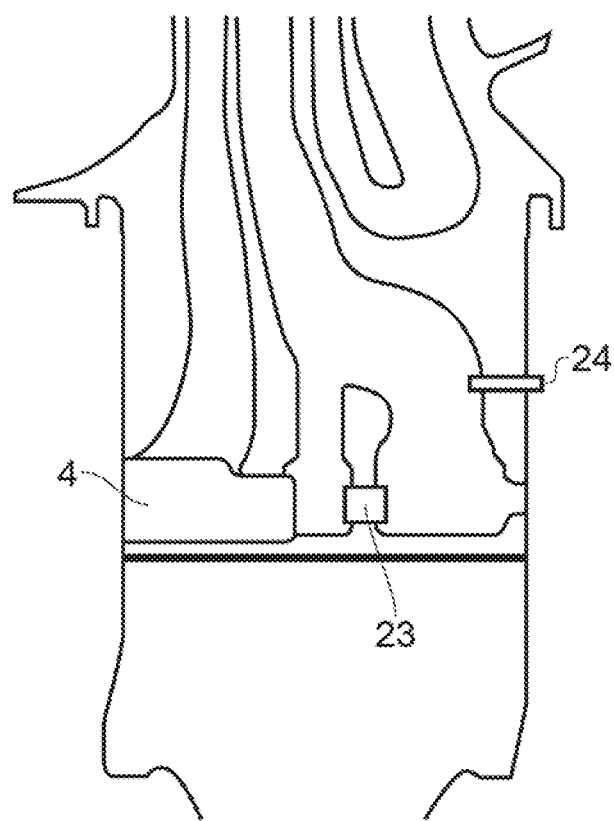
FIG. 7a is a cross section through the axis of a cast turbine blade as in FIG. 6 and illustrates the positions of post casting machining operations performed on the blade.
Figure 7B:
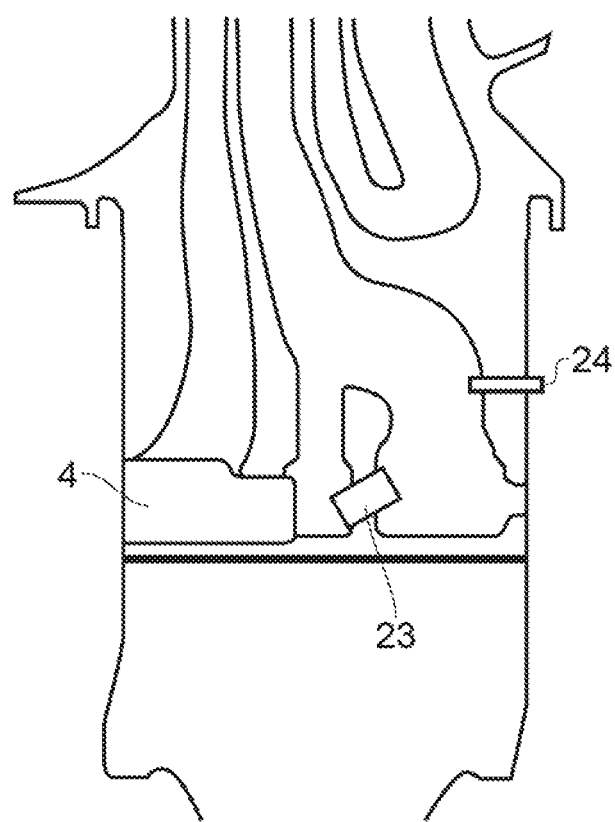

FIGS. 7a and 7b each show a machined upstream duct portion 4, a machined multi-pass channel 23 and machined feed hole 24 introduced into a blade of the same form as FIG. 6 after the casting step. In FIG. 7a, the multi-pass channel 23 is machined in line with a common axis of the cast duct portions. This, however, is not essential and FIG. 7b shows an alternative arrangement where the multi-pass channel 23 is machined angled towards the blade tip from the common duct axis.

Figure 8:
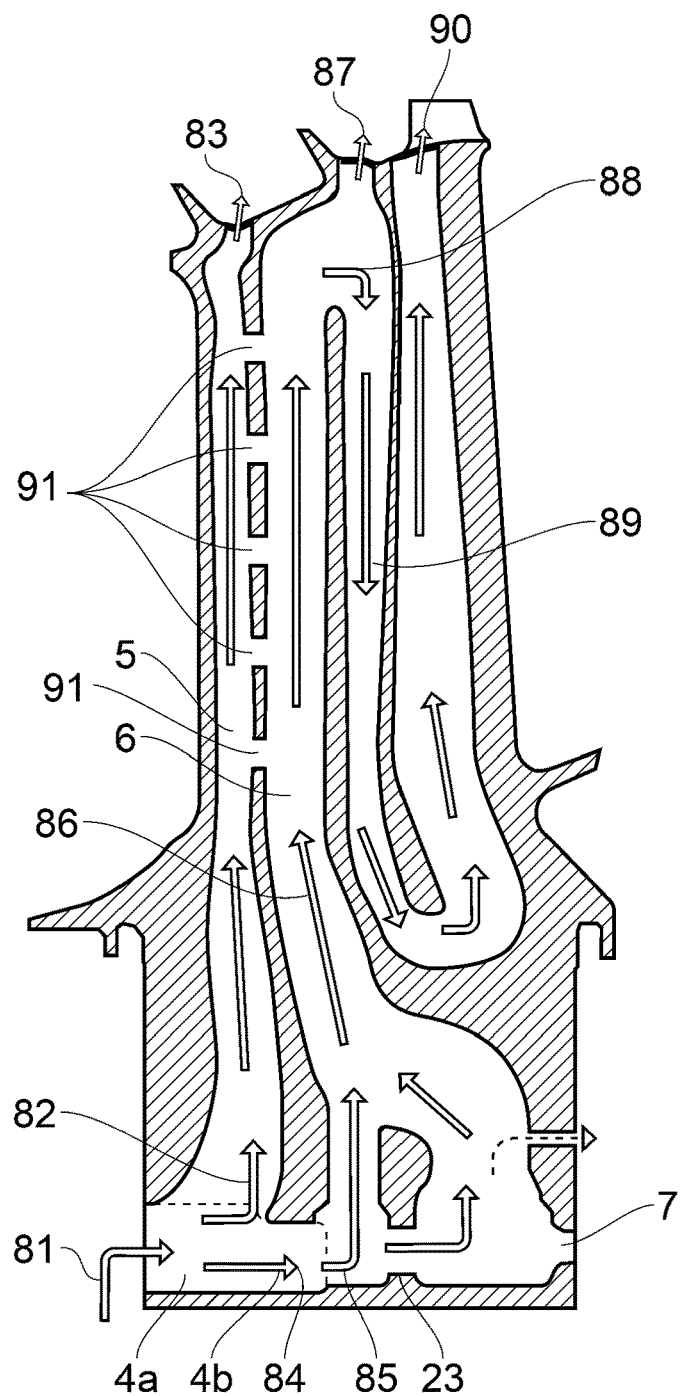
FIG. 8 is a cross section through the axis of a turbine blade incorporating a labyrinth arrangement in accordance with an embodiment of the invention and illustrates schematically the direction and volume of flow of coolant through the blade labyrinth.

FIG. 8 shows the flow of coolant through a turbine blade in accordance with the present invention when the blade is in operation in a gas turbine engine. The arrows show the direction of flow of coolant. Thicker arrows signify greater volumes of air flow. As can be seen, coolant 81 (typically supplied from the compressor and delivered to the turbine disc surface) is drawn into the inlet of the upstream duct portion. The relatively larger diameter first section 4a and its larger diameter intersection with the leading edge passage 5 encourages a larger portion of the incoming coolant to be drawn radially outwardly along the leading edge passage 82. The coolant travels the length of the leading edge passage to the blade tip where a small volume 83 escapes and serves to assist in cooling of the blade tip and a casing adjacent the tip (not shown). There may be further escape of the coolant 82 as it travels towards the tip via small cooling holes 91 machined in the leading edge of the blade. The remaining portion 84 of incoming coolant 81 flows into the second section 4b of the upstream duct portion 4 and into the mid-blade duct portion 9. The coolant turns 85 and travels up 86 a mid-blade positioned section of the multi-pass towards the blade tip. A small volume 87 again escapes through a small opening and assists in cooling of the blade tip and a casing adjacent the tip (not shown). The majority of flow 88 turns with the multi-pass and travels in a tip to root direction, turning again near the root and travelling up a section adjacent the trailing edge of the blade. The multi-pass terminates in a small opening at the blade tip through which a small volume 90 of coolant exits and assists in cooling of the blade tip and a casing adjacent the tip (not shown). There may be further escape of the coolant 89 as it travels towards the tip via small cooling holes machined in the blade, for example along the trailing edge (not shown).

As can be seen, a multi-pass channel 23 is provided connecting the mid-blade and downstream duct portions 9 and 7. The diameter of the multi-pass channel 23 can be varied to control the volume of coolant drawn towards the multi-pass and hence balance cooling rates across the blade from upstream to downstream.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A turbine blade having a labyrinth of internal channels for circulation of a coolant, the labyrinth comprising:
    an inlet integrally formed in a terminal portion of a blade root of the blade, the inlet being arranged on an axially upstream face of the terminal portion leading to an upstream duct portion having a first section adjacent to the inlet and a second section, the second section having a reduced cross section compared to the first section;
    a leading edge passage intersecting with the first section and extending through a blade body of the blade towards a tip of the blade, a proximal end of the leading edge passage being angled, in use, towards a direction of incoming air flow;
    a main blade passage intersecting with a downstream duct portion, the downstream duct portion being arranged in axial alignment with the upstream duct portion and being separate from the upstream duct portion; and
    a restrictor passage intersecting with the main blade passage and extending towards a mid-blade duct portion, the mid-blade duct portion being in axial alignment with the upstream duct portion and the downstream duct portion, and the mid-blade duct portion being in fluid communication with the upstream duct portion.

2. The turbine blade as claimed in claim 1, further comprising a plurality of holes arranged on the blade body and connecting with one of the leading edge passage and the main blade passage to deliver a thin film of cooling air to an exposed surface of the blade.

3. The turbine blade as claimed in claim 1, wherein the main blade passage is a multi-pass passage incorporating multiple turns in three dimensions, which extends the main blade passage from between the blade root and the tip of the blade and from a middle section of the blade body, and continuing downstream to adjacent to a trailing edge of the blade.

4. The turbine blade as claimed in claim 1, wherein the mid-blade duct portion has a smaller cross section in an axially facing direction than the upstream duct portion.

5. The turbine blade as claimed in claim 1, wherein the restrictor passage is relatively narrow compared to the main blade passage and the leading edge passage where the main blade passage intersects the downstream duct portion and where the leading edge passage intersects the upstream duct portion.

6. The turbine blade as claimed in claim 1, which has been cast around a removable core, the core defining at least part of the labyrinth of channels.

7. The turbine blade as claimed in claim 6, further comprising a core breakout exit exiting a downstream face of the terminal portion.

8. The turbine blade as claimed in claim 7, further comprising a recess formed in the downstream face and around the core breakout exit and a plate secured in the recess to close the core breakout exit.

9. The turbine blade as claimed in claim 7, further including a slot in a terminal face of the terminal portion extending through the terminal portion and across the core breakout exit and a plate secured in the slot to obstruct the core breakout exit and close off the core breakout exit.

10. The turbine blade as claimed in claim 7, further including a seal plate having a location lug sized to fit the core breakout exit, the seal plate extending past the terminal face of the root to cover an interface of the blade root with a recess in a turbine disc reducing leakage of cooling air in a region of the interface.

11. The turbine blade as claimed in claim 1, further comprising an additional channel extending through a downstream wall of the mid-blade duct portion through to an upstream wall of the downstream duct portion to provide a second route to deliver coolant to the main blade passage via the downstream duct portion.

12. The turbine blade as claimed in claim 1, further comprising a feed channel extending from the main blade passage and exiting at a downstream face of the terminal portion to feed cooling air to a supply for cooling an adjacent turbine disc.

13. The turbine blade as claimed in claim 1, wherein a height of the mid-blade duct portion in a direction extending along a root-to-tip axis of the blade is between 0.6 and 0.7 times a height of the upstream duct portion.

14. The turbine blade as claimed in claim 1, wherein the mid-blade duct portion and an intersection of the mid-blade duct portion with the restrictor passage have a downstream wall positioned at a depth of about 50-70% of the blade root in an upstream-to-downstream axial direction.

15. The turbine blade as claimed in claim 1, wherein the restrictor passage has a linear axis which extends in a root-to-tip direction of the blade and the main blade passage, the restrictor passage intersecting with the main blade passage adjacent to a bend in the main blade passage where the main blade passage turns from a downstream position, in which the main blade passage intersects with the downstream duct portion, to a central position between an upstream wall and a downstream wall of the blade root.

16. A method for making the turbine blade having the labyrinth of internal channels in accordance with claim 1, the method comprising;
providing a mould defining an external geometry of the blade;
providing a core defining the internal geometry of the blade, the internal geometry defining the labyrinth of the internal channels of the blade;
casting the blade between the mould and the core;
removing the blade from the mould and the core; and
at the inlet on the axially upstream face, machining the upstream duct portion into an upstream region of a continuous duct portion, the upstream duct portion having the first section adjacent to the inlet and the second section downstream of the first section, where the second section has the reduced cross section as compared to the first section.

* * * * *